C. A. DORN, J. O. LUDLAM & C. F. & L. C. BONNOT.
CRUSHING OR PULVERIZING MILL.
APPLICATION FILED AUG. 16, 1906.

952,885.

Patented Mar. 22, 1910.
7 SHEETS—SHEET 1.

WITNESSES

INVENTORS,

C. A. DORN, J. O. LUDLAM & C. F. & L. C. BONNOT.
CRUSHING OR PULVERIZING MILL.
APPLICATION FILED AUG. 16, 1906.
952,885.
Patented Mar. 22, 1910.
7 SHEETS—SHEET 2.
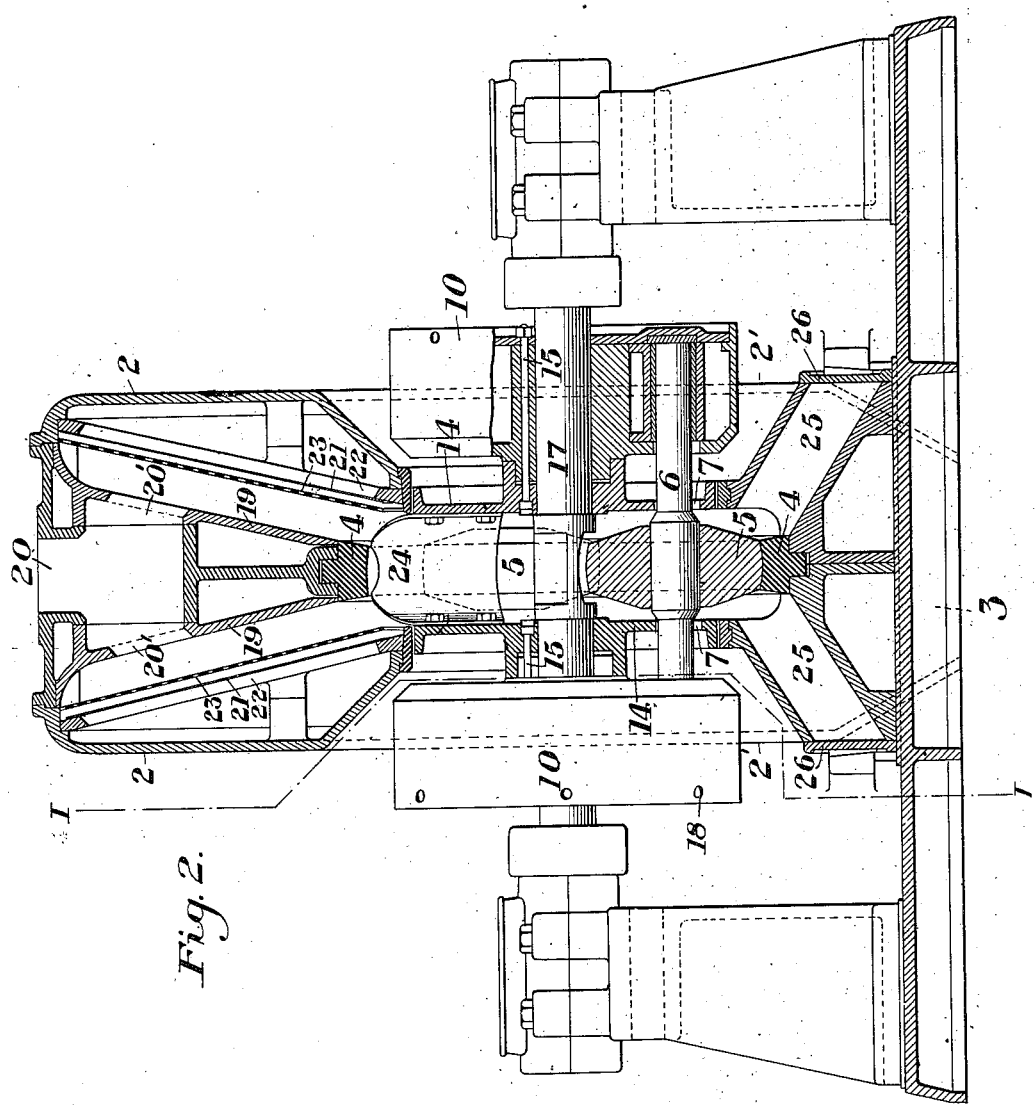

C. A. DORN J. O. LUDLAM & C. F. & L. C. BONNOT.
CRUSHING OR PULVERIZING MILL.
APPLICATION FILED AUG. 16, 1906.
952,885.
Patented Mar. 22, 1910.
7 SHEETS—SHEET 3.
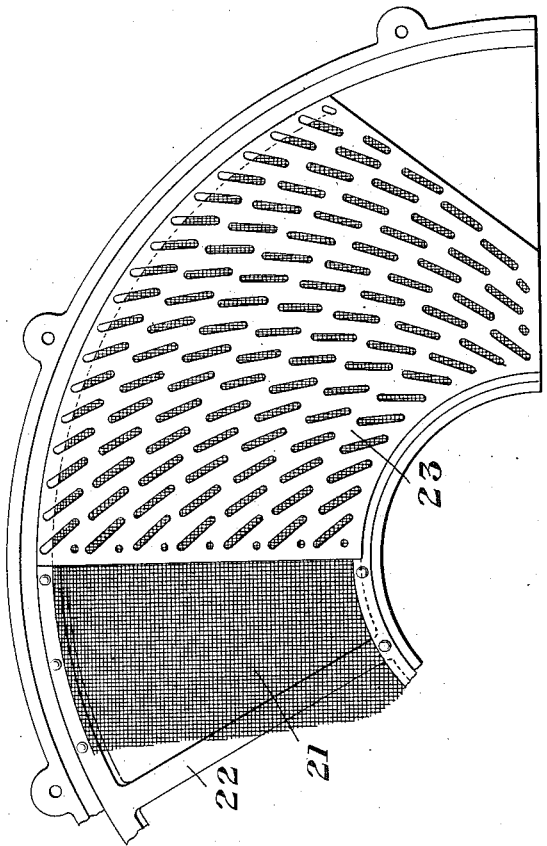
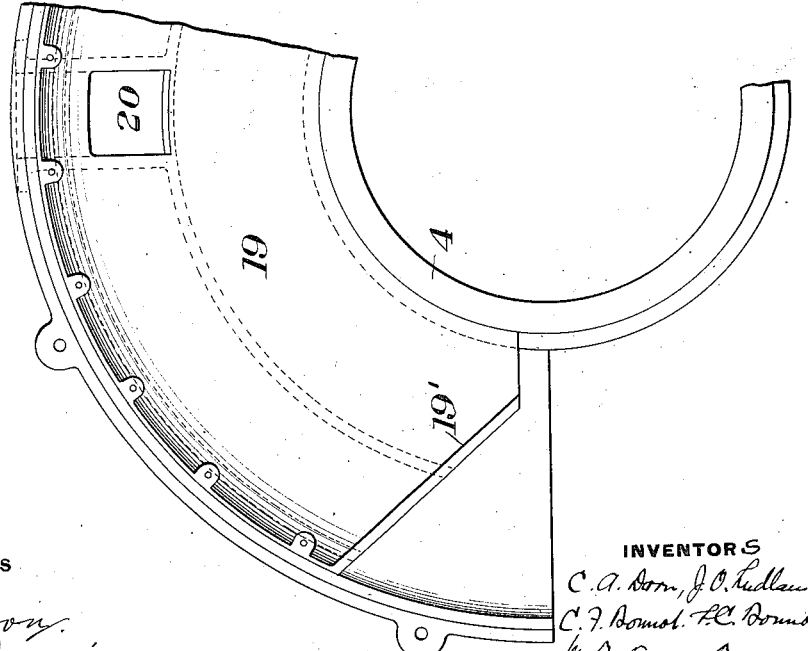
WITNESSES
INVENTORS C. A. DORN, J. O. LUDLAM & C. F. & L. C. BONNOT.
CRUSHING OR PULVERIZING MILL.
APPLICATION FILED AUG. 16, 1906.

952,885.

Patented Mar. 22, 1910.

7 SHEETS—SHEET 4.

WITNESSES
R. A. Balderson.

INVENTORS
C. A. Dorn, J. O. Ludlam,
C. F. Bonnot, L. C. Bonnot

C. A. DORN, J. O. LUDLAM & C. F. & L. C. BONNOT.
CRUSHING OR PULVERIZING MILL.
APPLICATION FILED AUG. 16, 1906.

952,885.

Patented Mar. 22, 1910.
7 SHEETS—SHEET 5.

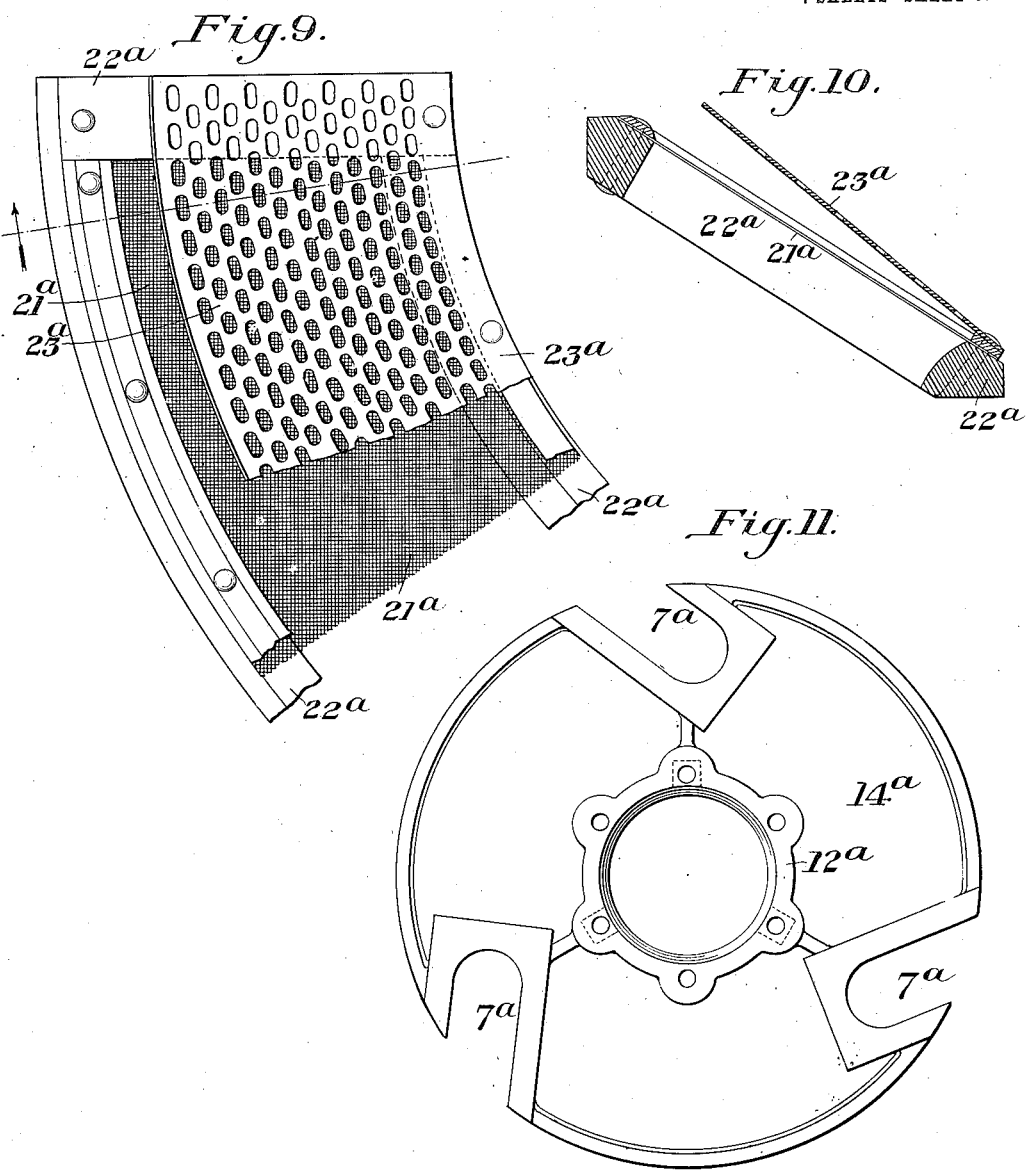

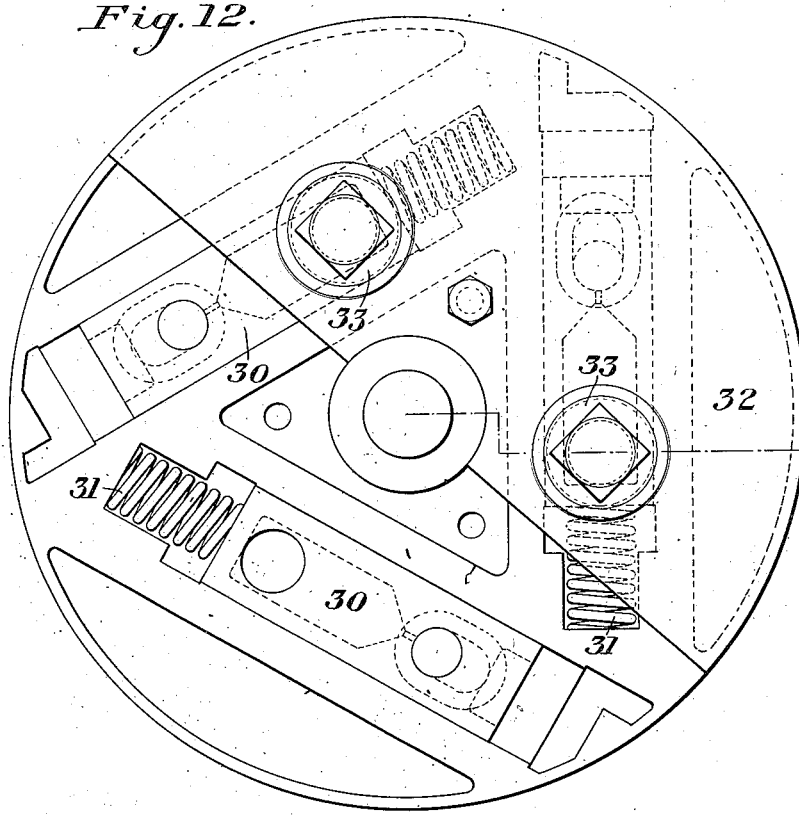
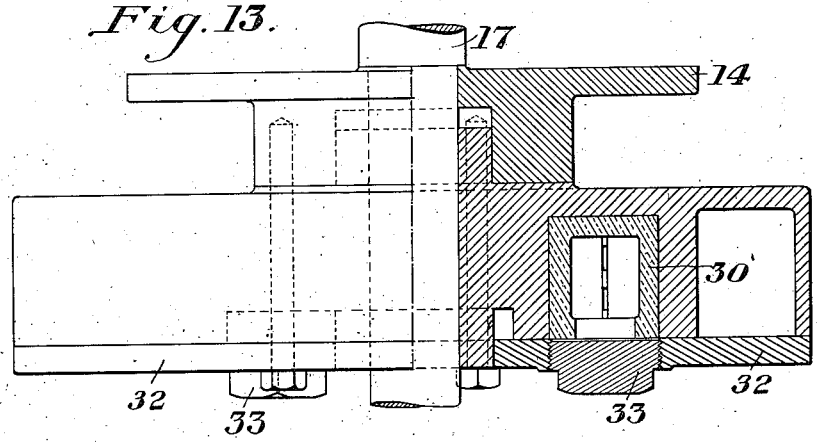

UNITED STATES PATENT OFFICE.

CHARLES A. DORN, JOHN O. LUDLAM, AND CHARLES F. BONNOT, OF CANTON, AND LOUIS C. BONNOT, OF LOUISVILLE, OHIO, ASSIGNORS TO THE BONNOT COMPANY, OF CANTON, OHIO, A CORPORATION OF OHIO.

CRUSHING OR PULVERIZING MILL.

952,885.      Specification of Letters Patent.      Patented Mar. 22, 1910.

Application filed August 16, 1906. Serial No. 330,814.

*To all whom it may concern:*

Be it known that we, CHARLES A. DORN, JOHN O. LUDLAM, and CHARLES F. BONNOT, of Canton, Stark county, Ohio, and LOUIS C. BONNOT, of Louisville, Stark county, Ohio, have invented a new and useful Crushing or Pulverizing Mill, of which the following is a full, clear, and exact description, reference being had to the accompanying drawings, forming part of this specification, in which—

Figure 1:
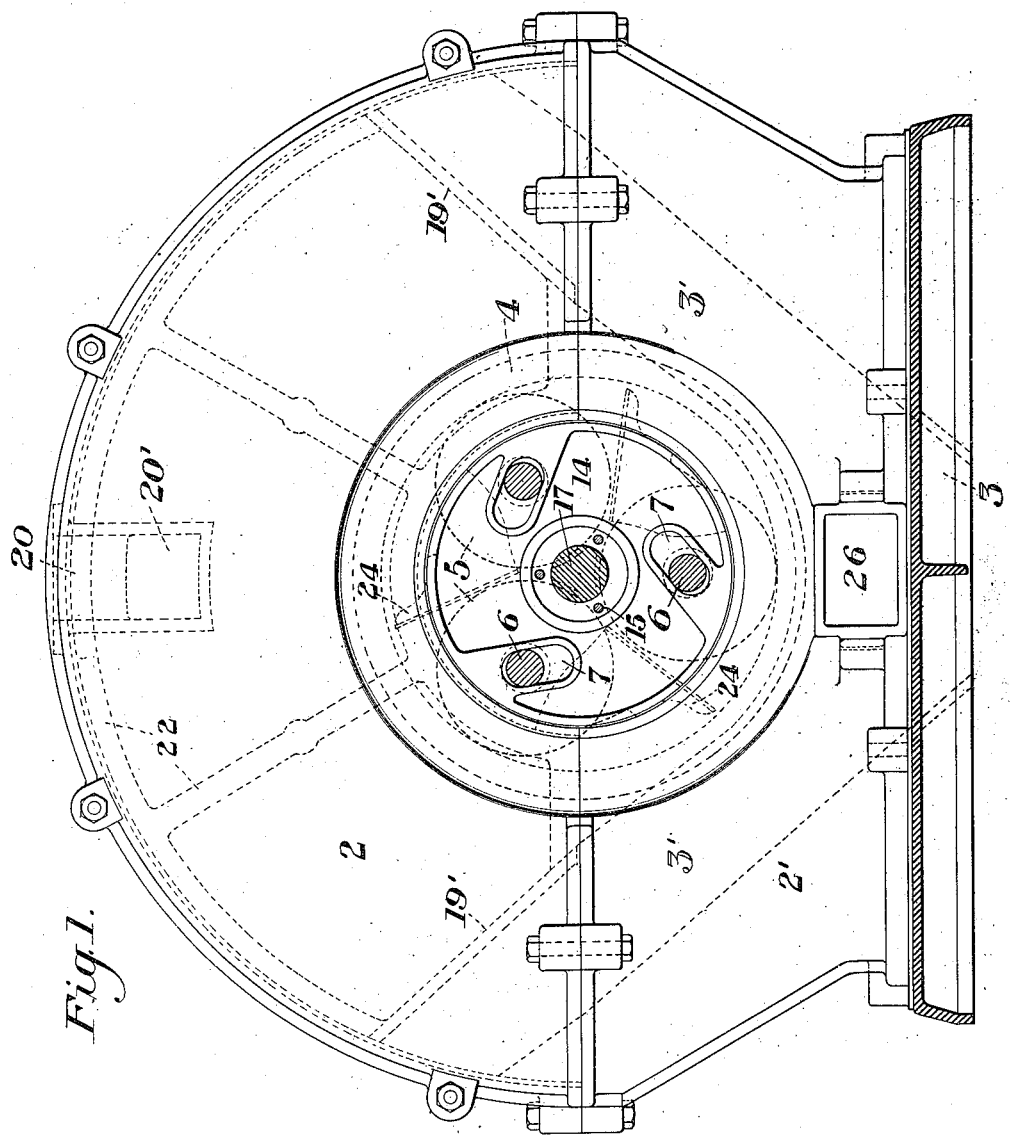
Figure 5:
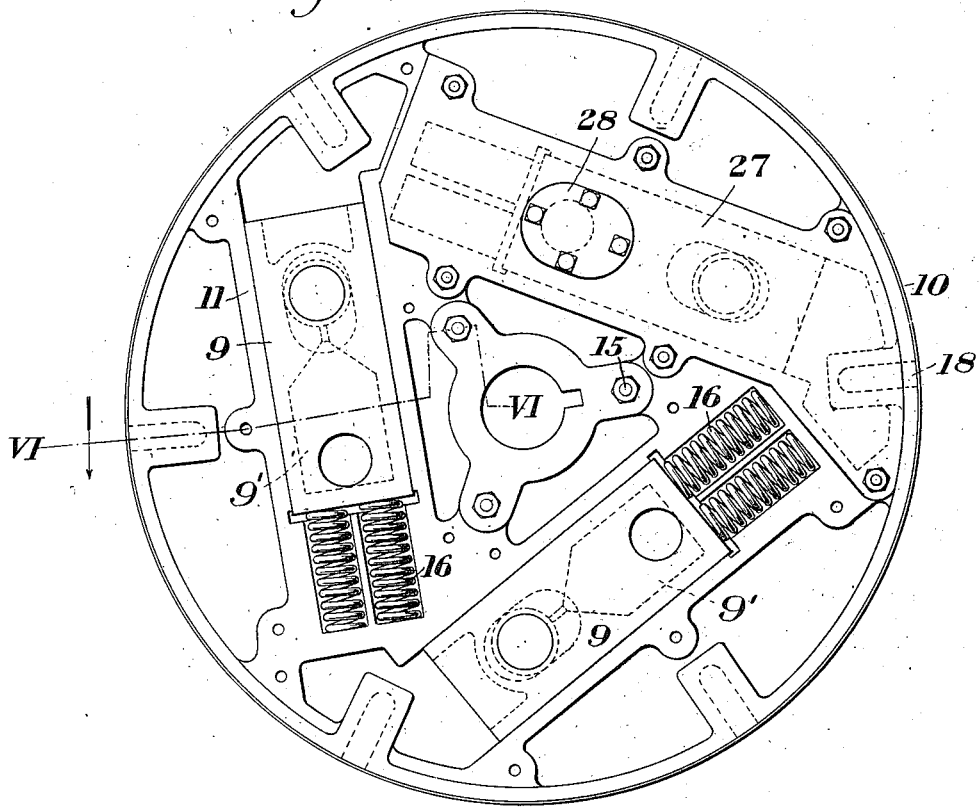
Figure 6:
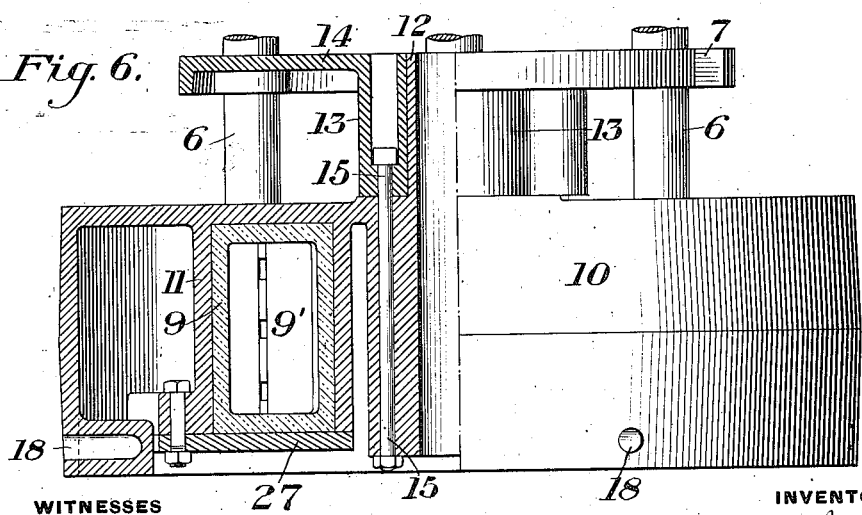
Figure 7:
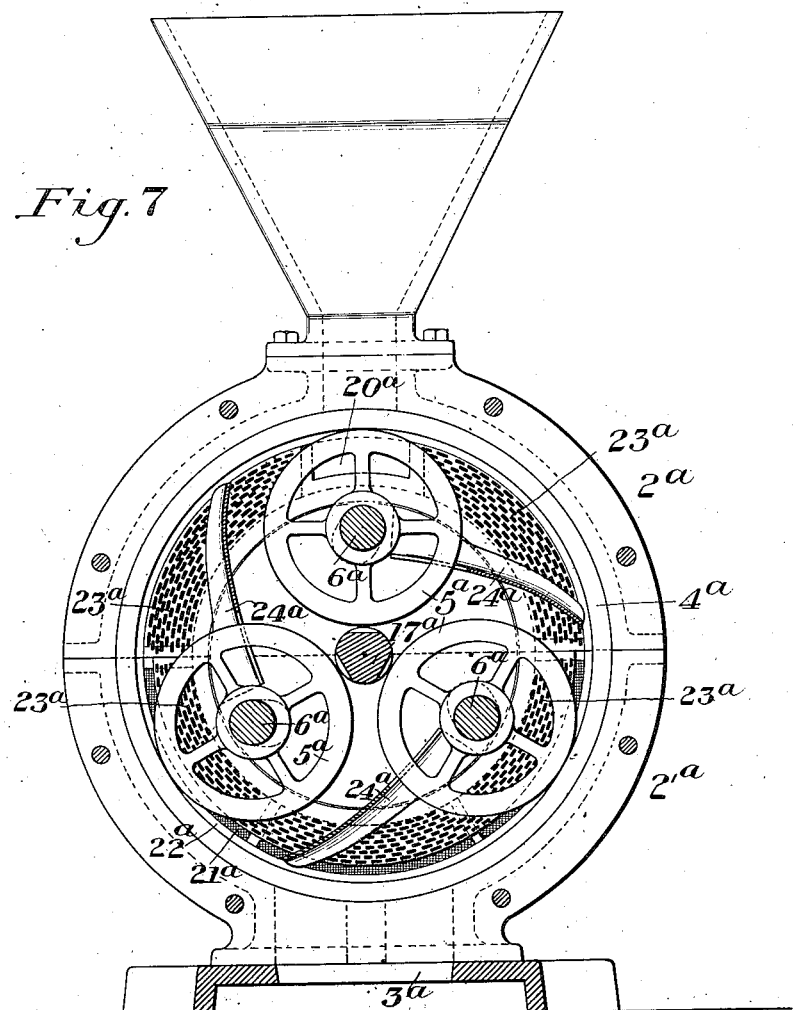
Figure 8:
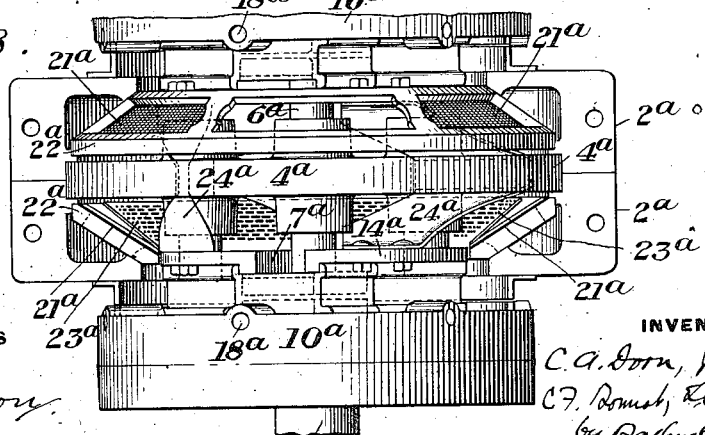

Figure 1 is a sectional side elevation showing the preferred form of our improved mill on the irregular line I—I of Fig. 2; Fig. 2 is a central cross-section; Fig. 3 is a detail view of the curved deflector and guide; Fig. 4 is a similar view of the baffle and screen; Fig. 5 is a plan view of a roller driver; Fig. 6 is a section on the irregular line VI—VI of Fig. 5; Fig. 7 is a vertical section showing a modified form; Fig. 8 is a top plan view partly broken away; Figs. 9, 10 and 11 are details hereinafter referred to; and Figs. 12 and 13 are views similar to Figs. 4 and 5 showing another form of the roller driver.

Our invention relates to the class of crushing or pulverizing machines, and is designed to provide a simple and efficient machine for such purpose which will pulverize materials rapidly and economically.

A further object of the invention is to prevent the discharge of dust from the machine, to make the machine readily accessible in all parts for repairs or changes, and to provide for simple and cheap construction.

In the drawings, referring to the form of Figs. 1 to 6, inclusive, we show a body or casing of general cylindrical form made up in longitudinally divided halves, the upper half being made up of screening elements, covered by plates 2, while the lower half is made up of the transversely-divided parts 2'. These parts are preferably flanged and bolted together, as shown in Figs. 1 and 2. At the bottom is an outlet port 3 formed between the casing sections and forming the lower end of the two oppositely-inclined feed-out channels 3'. Within the casing is provided a circular track 4 of hardened steel which is preferably cast in one piece, and seats within recesses in the sections of the casing. The interior of this track forms the grinding or pulverizing surface for the traveling crushing rolls or wheels 5, of which we have shown three, though any desired number may be used. Each wheel or roll is mounted on a short shaft 6, extending through slots 7 in the opposite cover plates of the casing. The ends of these shafts are mounted in bearing boxes 9 which slide within slot bearings in the oppo. ite roller drivers 10, one of which is shown in Fig. 5. Each of these roller drivers consists of a ring-shaped carrier containing the non-radial sets of guides 11 for the bearings of the rollers, and each of the bearings 9 is provided with a cavity 9', which may be filled with a lubricant, for automatically oiling the bearings of shaft 6. Each driver is also provided with a hub extension 12 around which fits the hub 13 of the cover plate 14 containing the slot 7 in registry with the bearings of the roller driver. These bearing plates may be secured in any desirable manner, as by the screw-bolts 15. We preferably employ sets of springs 16 which normally press the roller bearings outwardly to hold them in position when the machine is at rest. These springs have no material function when the machine is in operation, since the rollers are then forced outwardly against the track by centrifugal force under the high speed imparted. A pair of the roller drivers is provided, one on each side of the casing, each driver being secured to the shaft 17, which may be driven through a belt connection, or in any other desirable manner. Each roller driver is preferably cast with a series of radial holes or pockets 18 for the insertion of a rod or lever by which the rollers may be moved around to any point desired. Each side half of the casing is provided in its upper portion with a semi-annular cavity, whose lower inner ends communicate with the grinding chamber; and in each of these cavities is secured an annular deflecting plate 19 whose inner edges fit snugly the track 4. These deflectors are secured in the casing as shown in Figs. 2 and 3, and are outwardly inclined from said track so that their surfaces are parallel with the screening elements, the object of the deflectors being to properly direct the ground material from the pulverizing rolls, over the entire surface of the screens. The material is fed in to a top hopper, and thence passes through the inlet port 20, and the upper side ports 20'. In each of these cavities, is also placed a semi-annular sieve 21, which is secured in a suitable frame 22, and is inclined inwardly and downwardly toward the track. The sieve preferably consists of a fine wire mesh, and may be provided with a perforated cover-plate or baffle 23, as shown in Fig. 4. This cover-plate or baffle will prevent the larger particles from injuring the sieve proper. We also preferably employ inclined revolving plows 24, which extend outwardly, and may be secured to the cover disks, these directing the larger particles of the material upon the track where it is acted upon by the rollers. These revolving plows or scoops serve not only to distribute the material, but also to aid in creating suction which draws in air from both sides, thus preventing the discharge of dust into the room. The periphery of the cover plates 14 may be provided with slight diagonal depressions or recesses, for a free admission of air, which is drawn into the machine by these rapidly revolving vanes or plows. These plows may be constructed as shown of one piece, having upturned sides bolted to the cover plates 14, or each cover plate may be provided with an integral inwardly extending lug to form a part of the plow, and to these lugs may be bolted a plate which will receive the wear, and can be easily replaced when worn out. At the lower part of the casing are provided cleaning-out pockets 25, having removable closures 26.

In the operation of the device, the material feeds from a suitable hopper or spout, not shown in our preferred form, into the grinding chamber, while the main shaft is driven at high speed. Owing to the centrifugal action upon the rollers, whose bearings are free to move outwardly in a non-radial direction, these rollers will exert a pressure upon the circular rack as they roll thereon. They, therefore, move around in circular paths, and exert a yielding pressure upon the material between them and the track; so that it is pulverized or crushed in a rapid and economical manner. Owing to the suction in the machine air is drawn inwardly and discharged down through the outlet opening with the grinding material. The force of the moving parts of the machine will throw the ground material upwardly against the inclined faces of the deflector plates 19 in the semi-annular cavities of the upper half of the machine. This material dropping down by gravity will contact with the inwardly-inclined perforated baffles, which will catch the unground products and return them to the crushing rolls; and the fine material will pass through the screens and drop down through the feed-out channels 3'. The coarser material will follow down the inner face of the sieve and the inclined guides 19', shown in Figs. 1 and 3, and drop back into the pulverizing chamber proper. We believe ourselves to be broadly new in these downwardly and inwardly inclined sieves with means for throwing the material upwardly and outwardly so that it drops back along such sieves. The vanes or plows aid in the action of discharging the material upwardly for dropping through, the sieves. The perforated baffles act to protect the screens and to direct the larger particles backwardly where they are again acted upon by the rollers.

While the above described form of machine is our preferred form, especially on account of its large capacity and non-liability to clogging; at the same time, the machine may be made in other forms. Thus, in Figs. 7 to 11, we show another form wherein similar parts are designated by similar numerals with the letter "a" applied. In this form the sieves are annular and are not inwardly and downwardly inclined above the axis of the machine, as in the first form. In this case, the finer particles pass through the sieves by impact as the material is thrown against the sieves by the action of the plows and moving parts.

In Figs. 12 and 13, we show a cheaper and simpler form of the roller driver. In the first form shown, each bearing is provided with a removable cover plate 27 having a removable cap 28 for sealing the oil cavities; and the construction involves quite an amount of machine work. In the present form of Figs. 12 and 13, the bearing box is made in one piece 30 with the oil cavity therein, and a single spring 31 is employed, the bearings being held in place by a single cover-plate. This cover-plate may be either in one integral piece or in two halves 32. In this case we show oiling holes closed by screw-plugs 33.

The machine is simple and economical in operation. The peculiar position of the screens allows free discharge of the material from all parts of the chamber, while not interfering with the proper action of the grinding wheels. The perforated baffles avoid injury to the screens; the roller drivers give even pressure upon the rollers from both sides, while allowing the free movement of the bearings under centrifugal force.

The peculiar arrangement of the downwardly and inwardly inclined screens in the first form provides for a free outlet of the ground material so that there is no liability to clogging. This is one of the important features of our improved machine.

The screens may be secured in many other ways, the baffles may or may not be used, the plows may or may not be employed, though we prefer to use them; and many other changes may be made without departing from our invention.

We claim:—

1. In a crushing or grinding machine, a grinding chamber, a screening chamber arranged above the grinding chamber, and divided by a central deflector, and inclined screens or walls extending upwardly from the top of the grinding chamber at each side of the deflector; substantially as described.

2. In a crushing or grinding machine, a casing having a grinding chamber, and a screening chamber located directly over the grinding chamber, said screening chamber having a deflector arranged directly above the point of communication between the chambers, and an inclined screen wall in the screening chamber at each side of the deflector, the screen walls converging downwardly from the top of the screening chamber to the top of the grinding chamber; substantially as described.

3. In a grinding or pulverizing machine, a casing having a grinding chamber and a screening chamber located directly above the grinding chamber, rotary grinding means in the grinding chamber adapted to throw the ground material upwardly into the screening chamber, a pair of inclined screen walls in the screening chamber converging downwardly from the upper end thereof to the top of the grinding chamber, and means located between the screen walls for deflecting the material thrown upwardly into the screening chamber outwardly against said screen walls; substantially as described.

4. In a grinding or pulverizing machine, a casing having a grinding chamber and a screening chamber located directly above the grinding chamber, rotary grinding means in the grinding chamber adapted to throw the ground material upwardly into the screening chamber, a pair of inclined screen walls in the screening chamber converging downwardly from the upper end thereof, to the top of the grinding chamber, and means located between the screen walls for deflecting the material thrown upwardly into the screening chamber outwardly against said screen walls, said casing having a feed opening entering the upper part of the screening chamber and discharging therein at each side of the deflecting means; substantially as described.

5. In a crushing or grinding machine, a grinding chamber, a rotary grinder therein, a screening chamber arranged directly above the grinding chamber and into which the ground material is thrown upwardly by the action of the rotary grinder, said screening chamber having a central deflector and side screens, the deflector being arranged to deflect the material thrown upwardly by the grinder against the screens; substantially as described.

6. In a roller grinding machine, a casing, a circular track, a series of centrifugally acting rollers movable on the track, drivers for the said rollers, said casing having a cavity in its upper portion at each side of the track which communicates with the grinding chamber, a deflecting plate in each of said cavities, said plates fitting the track at their inner ends, and outwardly inclined therefrom, and screening elements parallel with said plates, and separated therefrom by spaces into which the material is thrown upwardly from the grinding chamber; substantially as described.

7. In a roller grinding machine, a circular track, a series of centrifugally acting rollers, outwardly diverging deflectors extending upwardly from the track, and screening elements parallel with said deflectors and between which and the deflectors the material is thrown upwardly from the grinding chamber; substantially as described.

In testimony whereof, we have hereunto set out hands.

CHARLES A. DORN.
JOHN O. LUDLAM.
CHARLES F. BONNOT
LOUIS C. BONNOT.

Witnesses:
R. J. GOULD,
CHAS. M. BALL.